(12) United States Patent
Houdeau

(10) Patent No.: US 6,522,773 B1
(45) Date of Patent: Feb. 18, 2003

(54) FINGERTIP SENSOR WITH INTEGRATED KEY SWITCH

(75) Inventor: Detlef Houdeau, Langquaid (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/261,865

(22) Filed: Mar. 3, 1999

(30) Foreign Application Priority Data

Mar. 3, 1998 (EP) .............................................. 98103738

(51) Int. Cl.[7] .................................................. G06K 9/00
(52) U.S. Cl. ...................... 382/124; 340/5.83
(58) Field of Search ................................. 382/115, 116, 382/124, 125, 126, 127; 235/380, 492; 902/3, 4, 25; 340/825.3, 825.34; 283/68; 356/71; 705/1, 26, 42; 70/277; 704/246, 273

(56) References Cited

U.S. PATENT DOCUMENTS 3,201,961 A * 8/1965 Williams et al. .............. 70/277

6,064,753 A * 5/2000 Bolle et al. .................. 382/125

FOREIGN PATENT DOCUMENTS

| DE | 2501516 | 7/1976 |
|---|---|---|
| EP | 0805247 A1 * | 11/1997 |
| FR | 2736179 | 1/1997 |
| JP | 57-088255 | 5/1982 |
| JP | 60-114979 | 6/1985 |
| JP | 62-56004 | 4/1987 |
| JP | 62-119904 | 7/1987 |
| JP | 63-05551 | 1/1988 |
| JP | 63-192852 | 12/1988 |

* cited by examiner

Primary Examiner—Samir Ahmed
(74) Attorney, Agent, or Firm—Laurence A. Greenberg; Werner H. Stemer; Ralph E. Locher

(57) ABSTRACT

A fingertip sensor with a biometric sensor element for detecting fingerprints, the activation or deactivation is effected by touching and releasing the sensor element.

5 Claims, 2 Drawing Sheets

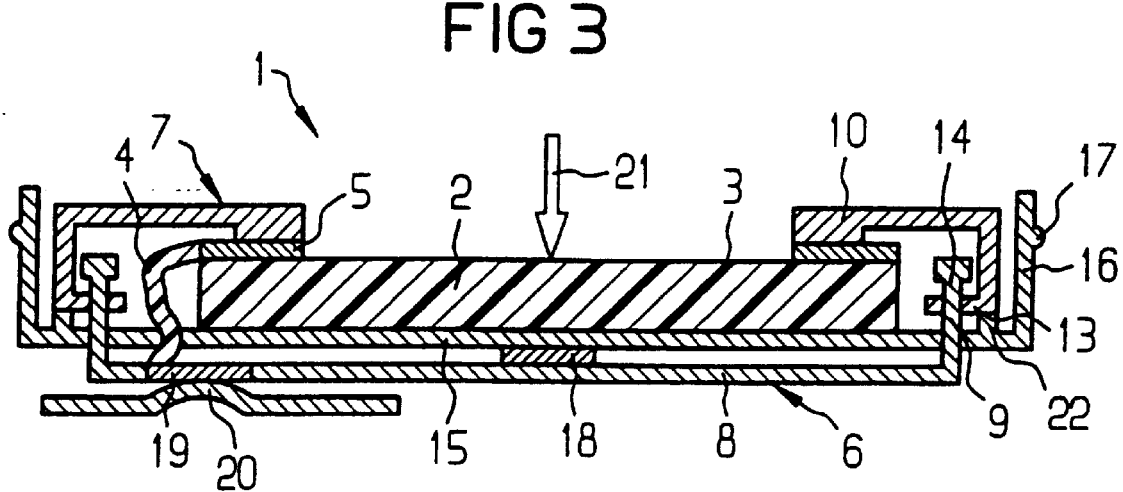

FINGERTIP SENSOR WITH INTEGRATED KEY SWITCH

BACKGROUND OF THE INVENTION

Field of the Invention

The invention relates to a fingertip sensor with a biometric sensor element for detecting fingerprints as disclosed in Published European Patent Application EP 0 805 247 A1.

To identify an ambulatory equipment user, for instance, personal identification numbers can be used. It is also known to detect characteristics specific to a given person for security purposes, such as fingerprints (minutiae) using biometric sensor elements and to enable or refuse access to equipment or a room and so forth, depending on the outcome of this detection. Detecting biometric characteristics of a person along these lines can be used either alone or in conjunction with identification numbers and provides a further, significant increase in security against unauthorized use.

Known biometric sensor elements include those with a piezoelectric layer, which ascertains local differences in capacitance under the control of an electrode array, and these differences can be used to recognize the minutiae. It is also known to call up the fingerprint directly with a capacitor array, which simply utilizes the height difference of the minutiae relative to the counterelectrode array.

However, especially for the sake of energy economy, a fingertip sensor of this type should be electrically activated and called up only during the fingertip contact. To that end, it is known to provide an additional proximity switch, which is coupled with the biometric sensor. This entails relatively great effort, however.

SUMMARY OF THE INVENTION

It is accordingly an object of the invention to provide a fingertip sensor with an integrated key switch that overcomes the above-mentioned disadvantages of the prior art devices of this general type, whose activation or deactivation can be accomplished in an especially simple, economical way when the sensor element is pressed and released.

With the foregoing and other objects in view there is provided, in accordance with the invention, a fingertip sensor, including: a biometric sensor element for detecting fingerprints; a sensor housing having a bottom part and a top part displaceable relative to the bottom part, the biometric sensor element retained on the top part; a spring operatively connected to at least one of the biometric sensor element and the top part, the spring generating a prestressing force for moving the biometric sensor element and the top part away from the bottom part; and a switch contact disposed on the bottom part for activating and deactivating the biometric sensor element, if the biometric sensor element is depressed the switch contact is closed, thereby effecting the activation of the biometric sensor element, and when the biometric sensor element is not depressed the switch contact is opened and the biometric sensor element is deactivated.

In the fingertip sensor of the invention, the sensor housing includes a bottom part and a top part that is displaceable relative to the bottom part, and the sensor element is retained on the top part. The sensor element and/or the top part is operatively connected to a spring, which generates a prestressing force that moves the sensor element and the top part away from the bottom part. A switch contact for activating or deactivating the fingertip sensor is also provided on the bottom part. When the sensor element is depressed it is closed, thereby effecting its activation, and when the sensor element is not depressed it is opened, so that the sensor element is deactivated.

The fingertip sensor of the invention makes activation or deactivation in a very simple, economical way. It is especially advantageous that the user can find the middle of the sensor field in tactile fashion, and the requisite finger pressure is at a minimum in that region. This assures reliable detection of the minutiae. The user also receives a mechanical (or under some conditions acoustical) "acknowledgment" of a successful contact, when the sensor element strikes the switch contact. The rebound time is used to assure that the finger will touch the sensor for a long enough time. Another advantage is that the fingertip sensor of the invention can be integrated into the number pad of conventional telephones, and especially portable phones.

In an advantageous embodiment of the invention, the spring includes a leaf spring, which is secured to the bottom part and has a middle region that is convexly curved toward the sensor element and rests on the back side of the sensor element. Such leaf springs are economical and make a low-height configuration possible. At the same time, such a leaf spring can be used as a contacting element for closing the switch contact, so that no additional electronics are needed for that purpose.

Expediently, the top part has a chamfer extending all the way around and points toward a sensor field. As a result, the middle of the sensor field is easy to find by tactile methods, which makes it easy to find the precise finger position needed.

Advantageously, the top part in its peripheral region is guided mechanically inside guide recesses in the bottom part. This makes a very simple embodiment possible, without separate guide elements having to be glued or welded into place.

The housing may be manufactured of simple plastic injection-molded parts, for instance of ABS. The coloring of the top can be done in the course of constructing the apparatus.

Other features which are considered as characteristic for the invention are set forth in the appended claims.

Although the invention is illustrated and described herein as embodied in a fingertip sensor with an integrated key switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a sectional view of the fingertip sensor in a depressed state of the sensor element, that is, with the fingertip sensor in an activated state.

DESCRIPTION OF THE PREFERRED EMBODIMENTS

Figure 1:
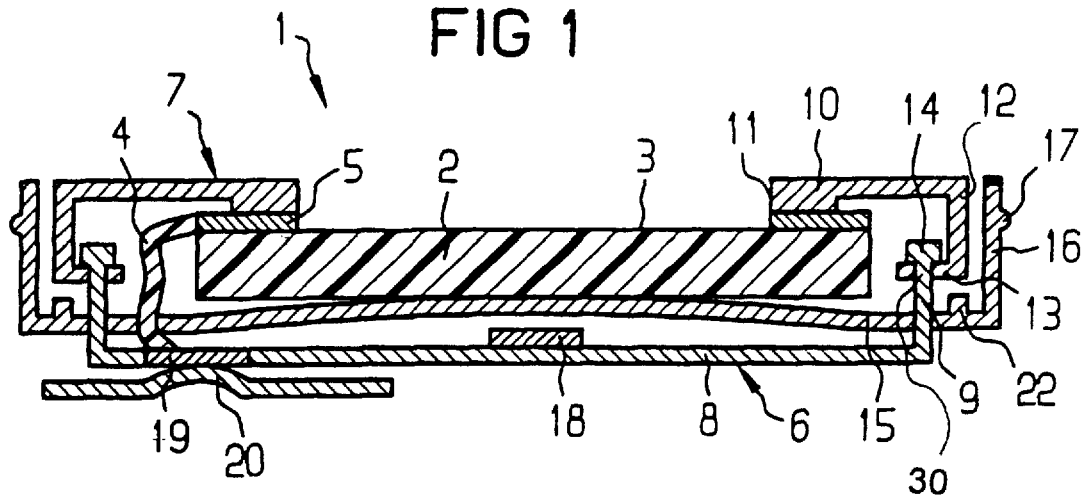
FIG. 1 is a cross sectional view through a fingertip sensor having a sensor element in a non-depressed state, that is, in a deactivated state according to the invention.

In all the figures of the drawing, sub-features and integral parts that correspond to one another bear the same reference symbol in each case. Referring now to the figures of the drawing in detail and first, particularly, to FIG. 1 thereof, there is shown a fingertip sensor 1 with a biometric sensor element 2. The sensor element 2 has a flat upper sensor face 3, which is configured such that when a finger is placed on the upper sensor face 3, the minutiae, that is the fingerprint, can be detected. The supply of current to the sensor element 2 and the electrical connection between the sensor face 3 and a non-illustrated electronic evaluation unit are effected via flexible conductor tracks 4, which are connected to corresponding contact points 5 on the upper sensor face 3 and to corresponding contact points 19 on the bottom portion 8 of the bottom part 6.

The sensor element 2 is received in a housing, which essentially includes a bottom part 6 and a top part 7. The bottom part 6 is essentially bowl-shaped and has a flat bottom portion 8 of rectangular outline and side walls 9 that extend vertically upward from the peripheral regions of the bottom portion 8.

The top part 7 includes an upper, horizontal top portion 10 with a central rectangular recess 11, vertical side wall portions 12 that extend downward from the outer edge of the horizontal top portion 10, and horizontal guide portions 13, which extend horizontally inward, that is, toward the sensor element 2, from a lower edge of side wall portions 12.

As indicated in FIGS. 1 and 3, the horizontal guide portions 13 of the top part 7 penetrate guide recesses 30, not shown in further detail, in the side walls 9 of the bottom part 6. The guide recesses 30 extend some distance vertically downward from a widened upper end region 14 of the side walls 9 of the bottom part 6. Because of this configuration, the guide portions 13 of the top part 7 can be displaced vertically in the guide recesses 30 of the side walls 9 of the bottom part 6, so that the entire top part 7, and hence the sensor element 2 as well, which is secured to the underside of the horizontal top portion 10, can be displaced vertically relative to the bottom part 6. A switch contact 18 for activating or deactivating the sensor element 1 is provided on the bottom part 8. When the sensor element 1 is depressed, the switch contact 18 is closed, thereby effecting activation of the sensor element 1. When the sensor element 1 is not depressed, the switch contact 18 is open, thus, the sensor element is inactive.

The sensor element 2 is embodied as a small flat, rectangular chip that is larger than a recess 11 in the top part 7, so that it extends laterally outward past the recess 11 and can be secured, in the peripheral region of its top side, to the underside of the horizontal top portion 10. The sensor face 3 inside the recess 11 of the top part 7 thus forms a sensor field, which is freely accessible from above and onto which the finger can be placed.

A spring 15 in the form of a leaf spring is disposed between the flat bottom portion 8 of the bottom part 6 and the sensor element 2. The spring 15 extends over the entire width of the bottom portion 8 and is fixed in the vertical side walls 9, facing one another, of the bottom part 6 that are visible in FIGS. 1 and 3. The spring 15 penetrates the vertical side walls 9 and extends farther outward, with its end portions 16 bent vertically upward. The vertical end portions 16 extend upward, spaced slightly apart from the vertical side wall portions 12 of the top part 7, so that they can move somewhat in the horizontal direction without touching the side wall portions 12. The upward-protruding end portions 16 of the spring 15 are used for mounting the fingertip sensor 1 in a recess of a non-illustrated housing. It is possible to press the fingertip sensor 1 into a housing recess of a kind in which outward-protruding beads 17 of the end portions 16 assure suitable detent locking in the housing.

Figure 2:
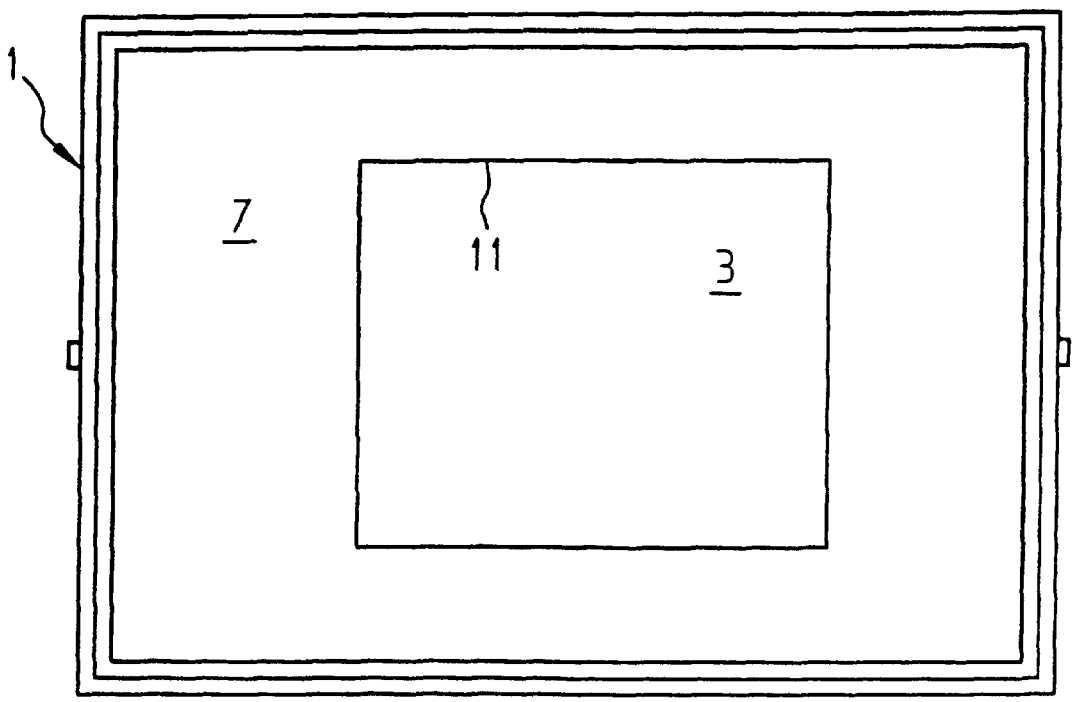
FIG. 2 is a plan view of the fingertip sensor of FIG. 1.

FIG. 2 is a top plan view of the fingertip sensor 1.

I claim:

1. A fingertip sensor, comprising:

a biometric sensor element for detecting fingerprints;

a sensor housing having a bottom part and a top part displaceable relative to said bottom part, said biometric sensor element retained on said top part;

a spring operatively connected to at least one of said biometric sensor element and said top part, said spring generating a prestressing force for moving said biometric sensor element and said top part away from said bottom part; and a switch contact disposed on said bottom part for activating and deactivating said biometric sensor element, if said biometric sensor element is depressed said switch contact is closed, thereby effecting the activation of said biometric sensor element, and when said biometric sensor element is not depressed said switch contact is opened and said biometric sensor element is deactivated, said spring acting as a contacting element for closing said switch contact, said spring having a spring surface, said spring surface having an approximate center, and said approximate center of said spring surface and said switch contact forming a switch, said switch closing upon said approximate center of said spring surface contacting said switch contact.

2. The fingertip sensor according to claim 1, wherein said biometric sensor element has a back side, said spring includes a leaf spring secured to said bottom part and has a middle region that is convexly curved toward said biometric sensor element and rests on said back side of said biometric sensor element.

3. The fingertip sensor according to claim 1, wherein said switch contact is located centrally under said biometric sensor element.

4. The fingertip sensor according to claim 1, wherein said biometric sensor element creates a sensor field and said top part has a chamfer extending all the way around and pointing toward said sensor field.

5. The fingertip sensor according to claim 1, wherein said bottom part has guide recesses formed therein and said top part has a peripheral region guided mechanically inside said guide recesses of said bottom part.

* * * * *